(12) United States Patent
Chen et al.

(10) Patent No.: US 7,334,903 B2
(45) Date of Patent: Feb. 26, 2008

(54) LIGHT SOURCE MODULE AND OPTICAL PROJECTION SYSTEM

(75) Inventors: Hun-Wei Chen, Taipei County (TW); Shih-Min Wu, Yilan County (TW); Chi-Neng Mo, Taoyuan County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 286 days.

(21) Appl. No.: 11/161,434

(22) Filed: Aug. 3, 2005

(65) Prior Publication Data
US 2007/0002282 A1    Jan. 4, 2007

(30) Foreign Application Priority Data
Jun. 30, 2005 (TW) .............. 94122089 A

(51) Int. Cl.
  G03B 21/20    (2006.01)
  F21V 9/16    (2006.01)
(52) U.S. Cl. .......................... 353/102; 353/31; 353/85; 362/84
(58) Field of Classification Search ............. 353/84, 353/55, 31, 85, 97, 122, 102; 349/61, 70, 349/71; 362/34, 84, 260, 261; F21V 9/16
See application file for complete search history.

(56) References Cited

U.S. PATENT DOCUMENTS

2005/0111236 A1* 5/2005 Hulse ..................... 362/555
2006/0077673 A1* 4/2006 Berman et al. ............ 362/458

OTHER PUBLICATIONS

Article titled "Improving brightness of the LCOS system" jointly published by Chen et al., IMID'05 DIGEST, pp. 737-739, 2005.

* cited by examiner

Primary Examiner—Andrew T Sever
(74) Attorney, Agent, or Firm—Jianq Chyun IP Office

(57) ABSTRACT

A light source module is provided. The light source module includes a reflector, a light source, a transparent cover, a fluorescent material layer, and an optical lens. The light source is disposed inside the reflector, and the light source is suitable for emitting light including white light. The light source is enveloped with the transparent cover and the reflector. The fluorescent material layer is disposed on the transparent cover and the light emitted from the light source is suitable for exciting the fluorescent material layer to emit red light. The optical lens is disposed on an optical path of the light source, and the transparent cover is located between the optical lens and the light source. By utilizing the aforementioned structures, the intensity of the red light can be increased. Moreover, an optical projection system is also provided.

24 Claims, 2 Drawing Sheets

LIGHT SOURCE MODULE AND OPTICAL PROJECTION SYSTEM

CROSS-REFERENCE TO RELATED APPLICATION

This application claims the priority benefit of Taiwan application serial no. 94122089, filed on Jun. 30, 2005. All disclosure of the Taiwan application is incorporated herein by reference.

BACKGROUND OF THE INVENTION

1. Field of the Invention

The present invention relates to an optical system. More particularly, the present invention relates to a light source module and an optical projection system.

2. Description of Related Art

In recent years, the liquid crystal display technology is widely applied in our daily lives, such as liquid crystal televisions, notebook computers, the liquid crystal display (LCD) of desktop computers and liquid crystal projectors. Wherein, the liquid crystal projector is an important element for large-scale display technology. Most liquid crystal projectors apply liquid crystal panels with high resolution to enhance the display quality.

The conventional liquid crystal panel utilized in the liquid crystal projector is a liquid crystal display element formed on a glass substrate or a silicon substrate. Generally, the thin film transistor (TFT) or metal-oxide-semiconductor transistor (MOS transistors) is used as an active element in liquid crystal panels, and then the active element and the pixel electrode electrically coupled thereto drive the liquid crystals to perform the display function. With small volume and high resolution, the liquid crystal panel fittingly complies with the trend of a downsizing liquid crystal projector. In addition, the design of the optical projection system also determines the performance of the liquid crystal projector.

In the conventional reflective liquid crystal projector utilized in an optical projection system, the high-pressured mercury light source is usually adopted in the optical projection system as a light source. However, the optical characteristic of the high pressured mercury light source is that the intensity of green light is higher than that of red light, so in a white balance process, the driving voltage of the LCD panel corresponding to green light must be lowered to achieve the required white field. However, the control voltage has its range, so when the driving voltage of the LCD panel is lowered corresponding to the green light for white balance effect, the adjustment of gray level is limited.

SUMMARY OF THE INVENTION

Accordingly, the present invention is directed to a light source module capable of emitting a red light with higher intensity compared with the conventional light source module.

The present invention is also directed to an optical projection system having higher brightness compared with the conventional optical projection system.

According to an objective of the above, a light source module is provided, comprising a reflector, a light source, a transparent cover, a fluorescent material layer and an optical lens. Wherein, the light source is disposed in the reflector and the light source is adapted for emitting light including white light. The light source is enveloped by the transparent cover and the reflector. The fluorescent material layer is disposed on the transparent cover, wherein the light emitted from the light source is adapted for exciting the fluorescent material layer to emit red light. The optical lens is disposed on an optical path of the light source, and the optical lens and the light source are located on two sides of the transparent cover respectively.

According to an embodiment of the present invention, a portion of the light emitted from the light source are reflected by the optical lens to excite the fluorescent material layer to emit red light.

According to an embodiment of the present invention, the fluorescent material layer can be disposed between the transparent cover and the optical lens.

According to an embodiment of the present invention, the fluorescent material layer is disposed on a center area of the transparent cover.

According to an embodiment of the present invention, a distance between the optical lens and the transparent cover is from 11.8 mm to 36.8 mm.

According to an embodiment of the present invention, a diameter of a range for disposing the fluorescent material layer is from 4 mm to 10 mm.

According to an embodiment of the present invention, a wavelength of the red light excited by the fluorescent material layer is between 630 nm and 800 nm.

According to an embodiment of the present invention, the optical lens can be an ultraviolet-infrared (UV-IR) filter.

According to an embodiment of the present invention, the light source can be a high-pressured mercury light source.

According to an embodiment of the present invention, a material of the transparent cover comprises glass.

According to an objective of the above, an optical projection system is provided, comprising a light source module, a light-splitting module, a plurality of spatial light modulators (SLM), a light-combining module and a projector lens. Wherein the light source module comprises a reflector, a light source, a transparent cover, a fluorescent material layer and an optical lens. The light source is disposed in the reflector and the light source is adapted for emitting light including white light. The light source is enveloped by the transparent cover and the reflector. The fluorescent material layer is disposed on the transparent cover, and the light emitted from the light source is adapted for exciting the fluorescent material layer to emit red light. The optical lens is disposed on an optical path of the light source, and the optical lens and the light source are located on two sides of the transparent cover respectively. The light-splitting module is disposed on the optical path of the light source module for splitting the light emitted from the light source module into a plurality of color lights. The spatial light modulators (SLM) are disposed on the optical paths of the color lights respectively, giving the color lights corresponding image signals. The light-combining module is disposed on the optical paths of the color lights with image signals, for combining the color lights with image signals. The projection lens is disposed on the optical paths of the color lights with image signals behind the light-combining module, for projecting the color lights with image signals to form images.

According to an embodiment of the present invention, a portion of the light emitted from the light source is reflected by the optical lens to excite the fluorescent material layer to emit red light.

According to an embodiment of the present invention, the fluorescent material layer can be disposed between the transparent cover and the optical lens.

According to an embodiment of the present invention, the fluorescent material layer is disposed in a center area of the transparent cover.

According to an embodiment of the present invention, a distance between the optical lens and the transparent cover is from 11.8 mm to 36.8 mm.

According to an embodiment of the present invention, a diameter of a range for disposing the fluorescent material layer is from 4 mm to 10 mm.

According to an embodiment of the present invention, a wavelength of the red light excited by the fluorescent material layer is between 630 nm and 800 nm.

According to an embodiment of the present invention, the optical lens can be an ultraviolet-infrared (UV-IR) filter.

According to an embodiment of the present invention, the light source can be a high-pressured mercury light source.

According to an embodiment of the present invention, a material of the transparent cover comprises glass.

According to an embodiment of the present invention, the light-splitting module at least comprises a dichroic mirror.

According to an embodiment of the present invention, the spatial light modulators can be reflective spatial light modulators or transparent spatial light modulators.

According to an embodiment of the present invention, the spatial light modulators can be liquid crystal panels.

According to an embodiment of the present invention, the light-combining module at least comprises an X-cube dichroic prism.

To sum up, compared with the prior art, the light source module and the optical projection system of the present invention can produce a light with higher brightness, because a fluorescent material layer is formed on the transparent cover, and the fluorescent material layer can emit red light after receiving the ultraviolet (UV) light emitted from the light source.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Various specific embodiments of the present invention are disclosed below, illustrating examples of various possible implementations of the concepts of the present invention. The following description is made for the purpose of illustrating the general principles of the invention and should not be taken in a limiting sense. The scope of the invention is best determined by reference to the appended claims.

Figure 1:
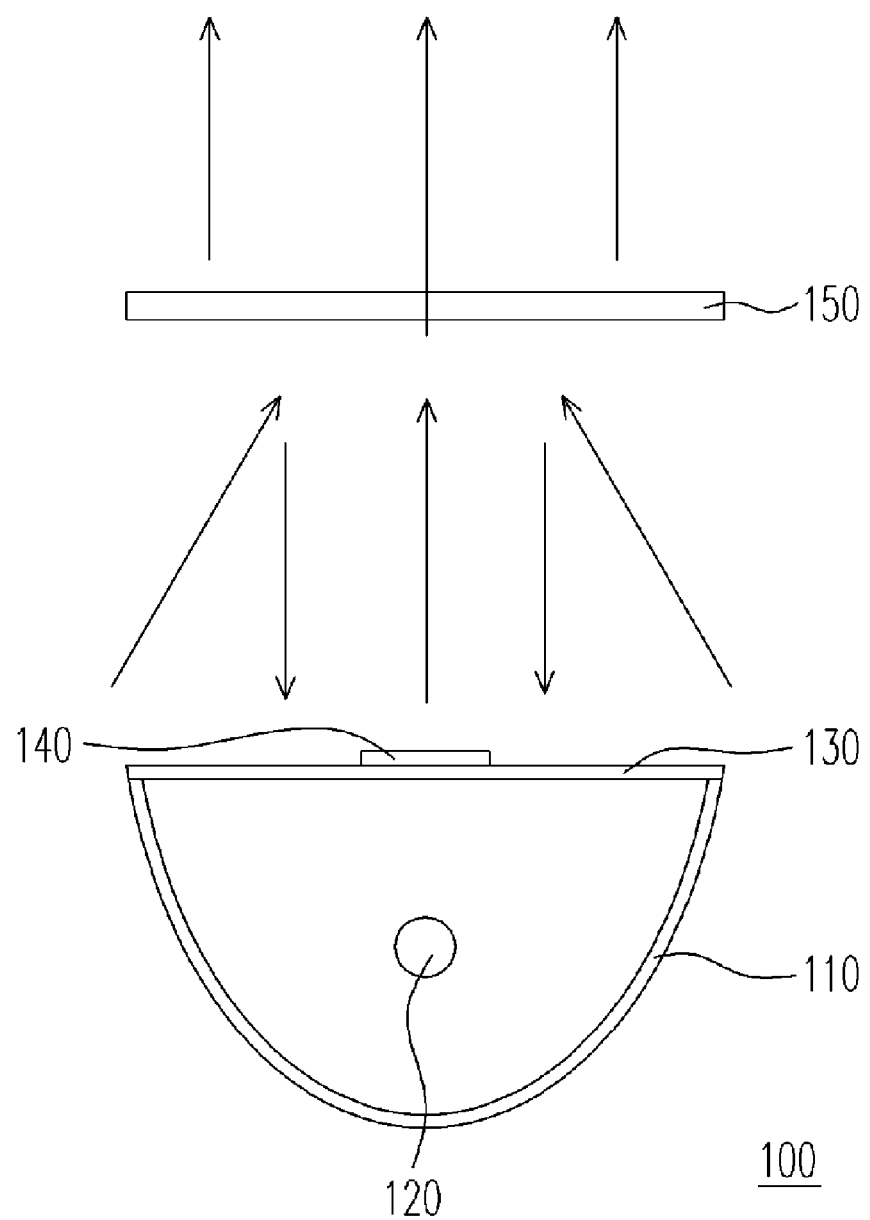
FIG. 1 is a cross-sectional view of a light source module according to one embodiment of the present invention.

FIG. 1 is a cross-sectional view of a light source module according to one embodiment of the present invention. Referring to FIG. 1, a light source module 100 comprises a reflector 110, a light source 120, a transparent cover 130, a fluorescent material layer 140 and an optical lens 150. The light source 120 is disposed in the reflector 110 and adapted for emitting light including white light, wherein the light source 120 can be a high-pressured mercury light source or other light sources capable of emitting white light. In addition, a material of the reflector 110 comprises metal or plastic. If the material of the reflector 110 is plastic, a reflective material layer can be formed on the inner wall of the reflector 110 to improve its reflectivity.

The light source 120 is enveloped by the transparent cover 130 and the reflector 110, wherein a material of the transparent cover 130 can be glass or plastic. The fluorescent material layer 140 is disposed on the transparent cover 130. And the light emitted from the light source 120 is suitable for exciting the fluorescent material layer 140 to emit red light. The fluorescent material layer 140 can be disposed in a center area of the transparent cover 130. For example, a diameter of range for disposing the fluorescent material layer 140 is from 4 mm to 10 mm. The optical lens 150 is disposed on an optical path of the light source 120, and the transparent cover 130 is between the optical lens 150 and the light source 120. The optical lens 150 can be an ultraviolet-infrared (UV-IR) filter or other lenses which can reflect ultraviolet light emitted from the light source 120.

The fluorescent material layer 140 can be disposed between the transparent cover 130 and the optical lens 150. Additionally, a distance between the optical lens 150 and the transparent cover 130 can be from 11.8 mm to 36.8 mm, for example. So a portion of the light emitted from the light source 120 can be reflected by the optical lens 150 to excite the fluorescent material layer 140 to emit red light. And the light emitted from the light source 120 can also excite the fluorescent material layer 140 directly to emit red light. For example, the material of the fluorescent material layer 140 can be red light fluorescent powders such as RU-R604 produced by Nantex Industry Corporation or other fluorescent materials which can excite a light whose wavelength is between 630 nm and 800 nm.

Compared with the prior art, the light source module 100 can produce a red light with higher intensity, because the fluorescent material layer 140 is formed on the transparent cover 130 and the fluorescent material layer 140 excited by ultraviolet light can emit the red light with a wavelength from 630 nm to 800 nm. In other words, compared with prior art, the light source module 100 of the present invention can produce a light with higher brightness. It should be noted that, in the present invention, the fluorescent material layer 140 is disposed in a center area of the transparent cover 130 because the light emitted from the light source 120 does not pass through the center area of the transparent cover 130. In addition, the light source module 100 of the present invention can be applied to reflective optical projection systems, transparent optical projection systems or other optical projection systems. In the following, a reflective optical projection system is discussed as an example.

Figure 2:
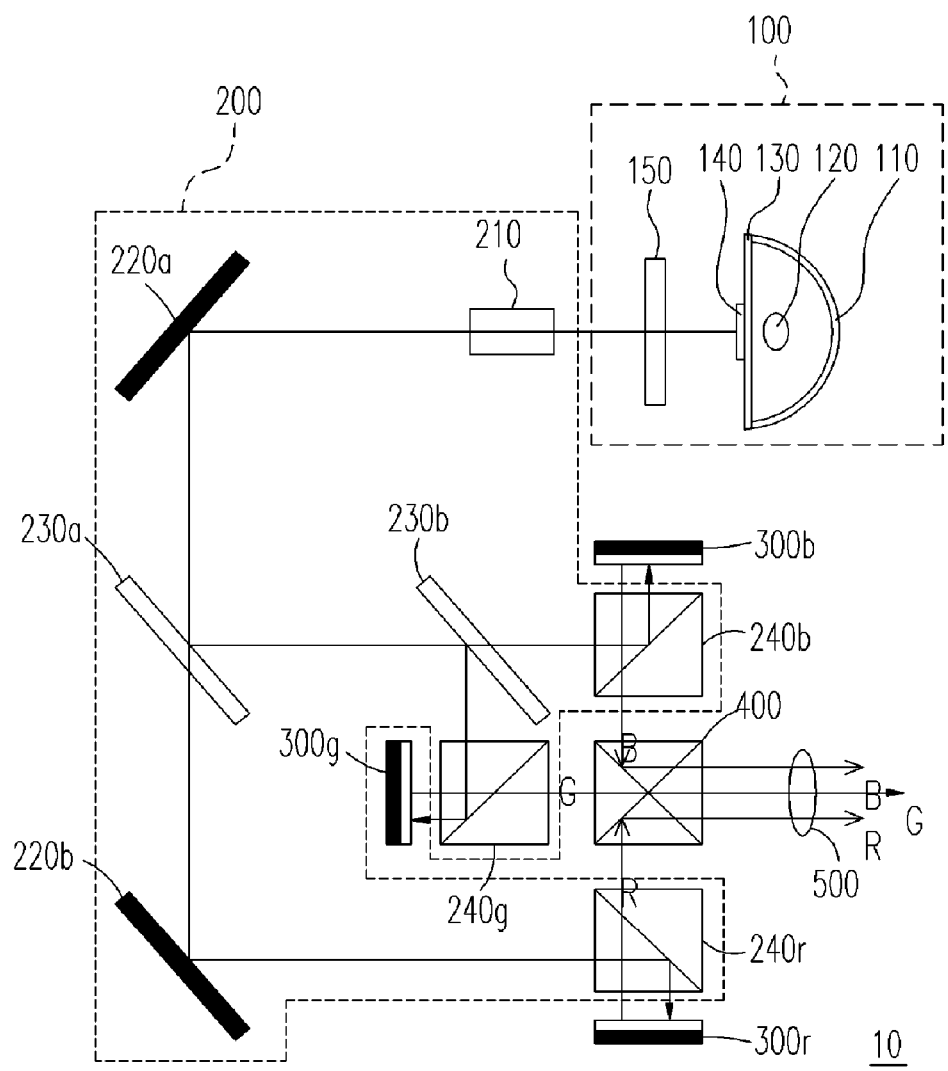
FIG. 2 is a cross-sectional view of an optical projection system according to one embodiment of the present invention.

FIG. 2 is a cross-sectional view of an optical projection system according to one embodiment of the present invention. Referring to FIG. 2, the optical projection system 100 comprises a light source module 100, a light-splitting module 200, a plurality of spatial light modulators (SLM) 300r, 300g and 300b, a light-combining module 400 and a projector lens 500. The light-splitting module 200 is disposed on the optical path of the light source module 100 for splitting the light emitted from the light source module 100 into a plurality of color lights, wherein the light-splitting module 200 at least comprises a dichroic mirror. In the present invention, the light-splitting module 200 comprises an S-P converter 210, reflective mirrors 220a and 220b, dichroic mirrors 230a and 230b and polarization beam splitters 240r, 240g and 240b.

These spatial light modulators (SLM) 300r, 300g and 300b comprise reflective SLMs or transparent SLMs. In the present embodiment, the spatial light modulators (SLM) 300r, 300g and 300b can be liquid crystal on silicon display panels (LCOS panel), high temperature polysilicon liquid crystal display panels (HTPS LCD panel) or others types of liquid crystal display panels. Additionally, the light-combining module 400 can be an X-cube dichroic prism.

Specifically, the light emitted from the light source module 100 is converted into S-polarized light via the S-P converter 210. Next, the transmission direction of the S-polarized light is changed by the reflective mirror 220a to be incident to the dichroic mirror 230a. Afterwards, the S-polarized light is split into S-polarized red light and S-polarized blue green light by the dichroic mirror 230a, wherein the S-polarized red light is reflected by the reflective mirror 220b and incident to the polarization beam splitter 240r. The S-polarized red light is reflected by the polarization beam splitter 240r to the SLM 300r because the light incident to the polarization beam splitter 240r is reflected or passed through depending on the polarization direction of the light. Next, the S-polarized red light is modulated by the SLM 300r and changed into a red light R with image signals, and a polarization direction of the red light R is changed into P-polarization direction.

The S-polarized blue green light can be split into an S-polarized blue light and an S-polarized green light by the dichroic mirror 230b. Wherein, the S-polarized blue light is changed into blue light B with image signals after passing the polarization beam splitter 240b and the SLM 300b. Similarly, the S-polarized green light is changed into green light G with image signals after passing the polarization beam splitter 240g and the SLM 300g. And then, the red light R, green light G, blue light B with image signals are incident to the light-combining module 400 respectively to be light-combined. The light-combined red light R, green light G, blue light B with image signals are projected on a screen (not shown) via the projector lens 500 to display images thereon.

Compared with the prior art, in the present invention, a driving voltage of the SLM 300g needs not be lowered too much for a white balance effect since the light source module 100 can emit a red light with higher intensity. In other words, without changing the optical system, the optical projection system 10 of the present invention can produce lights with higher brightness.

In summary, the light source module and the optical projection system of the present invention have at least the following advantages.

(1). Compared with the prior art, the light source module and the optical projection system of the present invention can produce lights with higher brightness because a fluorescent material layer is formed on the transparent cover, and the fluorescent material layer emits red light after receiving the ultraviolet (UV) light emitted from the light source.

(2). The fluorescent material layer disposed in the center area of the transparent cover does not reduce the intensity of the light emitted from the light source because the light does not pass through the center area thereof. In addition, the fluorescent material layer would emit red light after being excited by the ultraviolet (UV) light emitted from the light source reflected by the optical lens.

(3). Without changing the system and operation method, the optical projection system of the present invention can produce lights with higher brightness.

The above description provides a full and complete description of the embodiments of the present invention.

Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. A light source module, comprising:
   a reflector;
   a light source, disposed in the reflector, wherein the light source is adapted for emitting light comprising white light, wherein the white light comprises a green light and a red light, and an intensity of the green light is higher than that of the red light;
   a transparent cover, wherein the light source is enveloped by the transparent cover and the reflector;
   a fluorescent material layer, disposed on the transparent cover, wherein a light emitted from the light source is adapted for exciting the fluorescent material layer to emit a compensating red light for compensating the white light emitted from the light source so as to obtain a better balanced white light spectrum; and
   an optical lens, disposed on an optical path of the light source, wherein the transparent cover is between the optical lens and the light source.

2. The light source module of claim 1, wherein the light emitted from the light source is reflected by the optical lens to excite the fluorescent material layer to emit red light.

3. The light source module of claim 1, wherein the fluorescent material layer is disposed between the transparent cover and the optical lens.

4. The light source module of claim 1, wherein the fluorescent material layer is disposed in a center area of the transparent cover.

5. The light source module of claim 1, wherein a distance between the optical lens and the transparent cover is between about 11.8 mm and about 36.8 mm.

6. The light source module of claim 1, wherein a diameter of a range for disposing the fluorescent material layer is between about 4 mm and about 10 mm.

7. The light source module of claim 1, wherein a wavelength of the red light excited by the fluorescent material layer is between about 630 nm and about 800 nm.

8. The light source module of claim 1, wherein the optical lens comprises an ultraviolet-infrared (UV-IR) filter.

9. The light source module of claim 1, wherein the light source comprises a high-pressured mercury light source.

10. The light source module of claim 1, wherein a material of the transparent cover comprises glass.

11. An optical projection system, comprising:
    a light source module, comprising:
       a reflector;
       a light source, disposed in the reflector, wherein the light source is adapted for emitting light comprising a white light, wherein the white light comprises a green light and a red light, and an intensity of the green light is higher than that of the red light;
       a transparent cover, wherein the light source is enveloped by the transparent cover and the reflector;
       a fluorescent material layer, disposed on the transparent cover, wherein a light emitted from the light source is adapted for exciting the fluorescent material layer to emit a compensating red light for compensating the white light emitted from the light source so as to obtain a better balanced white light spectrum; and an optical lens, disposed on an optical path of the light source, wherein the transparent cover is between the optical lens and the light source;

a light-splitting module, disposed on the optical path of the light source module for splitting the light emitted from the light source module into a plurality of color lights;

a plurality of spatial light modulators (SLM), disposed on the optical paths of the color lights respectively, giving the color lights corresponding image signals;

a light-combining module, disposed on the optical paths of the color lights with image signals, for combining the color lights with image signals; and a projection lens, disposed on the optical paths of the color lights with image signals behind the light-combining module, for projecting the color lights with image signals via the projection lens to form images.

12. The optical projection system of claim 11, wherein the light emitted from the light source is reflected by the optical lens to excite the fluorescent material layer to emit red light.

13. The optical projection system of claim 11, wherein the fluorescent material layer is disposed between the transparent cover and the optical lens.

14. The optical projection system of claim 11, wherein the fluorescent material layer is disposed in a center area of the transparent cover.

15. The optical projection system of claim 11, wherein a distance between the optical lens and the transparent cover is between about 11.8 and about 36.8 mm.

16. The optical projection system of claim 11, wherein a diameter of a range for disposing the fluorescent material layer is between about 4mm and about 10 mm.

17. The optical projection system of claim 11, wherein a wavelength of the red light excited by the fluorescent material layer is between about 630 nm and about 800 nm.

18. The optical projection system of claim 11, wherein the optical lens comprises an ultraviolet-infrared (UV-IR) filter.

19. The optical projection system of claim 11, wherein the light source comprises a high-pressured mercury light source.

20. The optical projection system of claim 11, wherein a material of the transparent cover comprises glass.

21. The optical projection system of claim 11, wherein the light-splitting module at least comprises a dichroic mirror.

22. The optical projection system of claim 11, wherein the spatial light modulators comprises reflective spatial light modulators or transparent spatial light modulators.

23. The optical projection system of claim 11, wherein the spatial light modulators comprise liquid crystal panels.

24. The optical projection system of claim 11, wherein the light-combining module at least comprises an X-cube dichroic prism.

* * * * *